United States Patent [19]

Chupp

[11] 3,723,455

[45] Mar. 27, 1973

[54] PREPARATION OF 1,4-SUBSTITUTED-IMIDAZOLIN-2-ONES

[75] Inventor: John P. Chupp, Kirkwood, Mo.

[73] Assignee: Monsanto Company, St. Louis, Mo.

[22] Filed: Apr. 22, 1971

[21] Appl. No.: 136,611

[52] U.S. Cl..........260/309.6, 260/295 L, 260/295 E, 260/349

[51] Int. Cl. .............................................C07d 49/34

[58] Field of Search....................................260/309.6

[56] References Cited

UNITED STATES PATENTS

| | | | |
|---|---|---|---|
| 2,707,186 | 4/1955 | Duschinsky | 260/309.6 |
| 3,136,776 | 6/1964 | Stoffel | 260/309.6 |
| 3,432,520 | 3/1969 | Pesterfield | 260/309.6 |
| 3,435,051 | 3/1969 | Pesterfield | 260/309.6 |
| 3,629,279 | 12/1971 | Pesterfield | 260/309.6 |

OTHER PUBLICATIONS

Schipper et al. In: Elderfield Heterocyclic Compounds Vol. 5. Pages 246–247 N.Y., Wiley, 1957. QD400.E4

*Primary Examiner*—Natalie Trousof
*Attorney*—Neal E. Willis, Paul C. Krizov and William T. Black

[57] ABSTRACT

1,4-Substituted-imidazolin-2-ones optionally substituted in the 5 position are prepared from N-propenyl-carbamoyl azides by thermolysis. The compounds are useful as analgesics, antipyretics, anti-inflammatories, herbicides and as intermediates in the preparation of imidazolidinones by hydrogenation which can be hydrolyzed to diamines which are useful in producing polyamides.

9 Claims, No Drawings

PREPARATION OF 1,4-SUBSTITUTED-IMIDAZOLIN-2-ONES

This invention relates to the production of 1,4-substitued-imidazoline-2-ones and is more particularly concerned with the production of such compounds by the thermolysis of carbamoyl azides bearing an N-allyl or terminally substituted allyl grouping with concomitant double-bond isomerization.

The preparation of various imidazolin-2-one derivatives by use of assorted catalytic methods is shown in the prior art. For example, Japanese Pat. No. 12,940, July 8, 1964 shows the preparation of imidazolidinone derivatives by treating propargylurea with a concentrated strong acid. There is also described in the literature a series of imidazolinone derivatives prepared by treating various substituted propynyl ureas with phosphorous pentachloride.

It is an object of the present invention to provide a rapid and cheap process for the synthesis of imidazolin-2-ones by cyclization of N-substituted N-(2-alken-1-yl) carbamoyl azides.

In accordance with the process of this invention, N-substituted carbamoyl azides of the formula

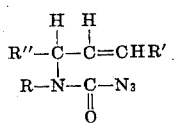

wherein R is hydrogen or a monovalent organic group selected from the class consisting of alkyl groups containing a maximum of 12 carbon atoms, cycloalkyl containing from four to seven carbon atoms, alkenyl groups containing from two to 12 carbon atoms, cycloalkenyl containing from four to seven carbon atoms, aralkyl groups containing from seven to 17 carbon atoms, aryl groups containing a maximum of 12 carbon atoms, such aryl groups substituted with halogen, lower alkyl, lower alkoxy, lower alkoxyalkyl, or trifluoromethyl, and halogen, and heterocyclic groups such as pyridyl, etc., R' and R'' are each independently selected from the group consisting of hydrogen, alkyl having from one to 12 carbon atoms, aralkyl, aryl containing from six to 12 carbon atoms and alkenyl containing from two to 12 carbon atoms, are heated to temperatures of from about 40°C to about 200°C. to cause said carbamoyl azide to release nitrogen and to thermally rearrange to produce an imidazolin-2-one of the formula

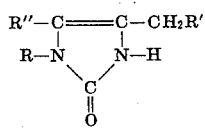

wherein R, R' and R'' are as above defined.

Although a solvent is not necessary in the process of this invention, it is preferred to employ solvent in this process to provide ease of handling of the reactants and products, ease of reaction and high yield of products. A solvent is also advantageously employed to dissipate the exothermic heat of reaction and to control the decomposition of the azides. Solvents which can be employed in the process of this invention are those solvents having boiling points in the range of from 40°C to about 200°C and in which the starting carbamoyl azides are soluble and which do not react with the azides. Such solvents are, for example, organic solvents, e.g., the chlorinated hydroaromatic hydrocarbons such as chlorobenzene, dichlorobenzene, chlorotoluene, chloroxylene, and the hydrocarbyl solvents such as benzene, toluene, xylene, heptane, dodecane, decane, hexane, octane, undecane, etc., haloalkanes, e.g., propyl chloride, butyl bromide, isobutyl chloride, etc. It is to be understood that this list is not exhaustive and many other suitable solvents will be apparent to those skilled in the art.

The temperature at which the process of this invention is conducted is not narrowly critical and can range from as low as 40°C to as high as 200°C. It is preferred to employ temperatures in the range of 100° to 150°C in the process of this invention. Such temperatures are easily reached by employing a solvent such as chlorobenzene or xylene in the process of this reaction and employing these solvents under reflux conditions.

Illustrative of the monovalent organic groups represented by R, R' and R'' are, for example, alkyl groups such as methyl, ethyl, propyl, isopropyl, n-hexyl, n-octyl, n-dodecyl, etc.; alkenyl groups such as vinyl, allyl, methallyl, butenyl, hexenyl, decenyl, dodecynyl, etc.; cycloalkyl groups such as cyclopropyl, cyclobutyl, cyclopentyl, cyclohexyl, cycloheptyl, etc.; aralkyl groups such as benzyl, phenylethyl, phenylpropyl, etc.; aryl groups such as phenyl, naphthyl, tolyl, xyllyl, and such aryl groups containing from one to three of the following ring substituents: Halogens such as fluorine, chlorine or bromine; trifluoromethyl; lower alkyl; e.g., methyl, ethyl, propyl, butyl, hexyl, etc., lower alkenyl; e.g., vinyl, allyl, butenyl, etc., lower alkoxyalkyl; e.g., methoxymethyl, ethoxyethyl, methoxypropyl, etc., lower alkoxy, such as methoxy, ethoxy, etc., and heterocyclic groups such as pyridyl, pyridinyl, pyrrolidinyl, etc.

The carbamoyl halides employed in the preparation of the azide starting materials for the process of this invention are prepared by reacting the corresponding amine or N-hydrocarbyl-N-alkylidene amine with phosgene in a benzene solvent, as shown in the following procedure using N-methyl-N-cyclohexylidene amine as an example.

N-methyl-N-cyclohexylidene amine (N-methylimine from cyclohexanone) (0.22 moles) dissolved in benzene was added dropwise to a 12.5 percent solution of phosgene in benzene which contained 25 grams of phosgene. After the imine had been added, the solution was refluxed for 1½ hours, cooled, and the reaction mixture filtered. The filtrate was vacuum treated to remove the solvent, and the residue distilled to give N-methyl-N-(1-cyclohexen-1-yl) carbamoyl chloride in a 62 percent yield.

The starting azides were then prepared by reacting the carbamoyl chlorides with sodium azide in 80 percent aqueous acetone in accordance with the following procedure showing the production of N-methyl-N-(1-cyclohexen-1-yl) carbamoyl azide as an example.

Sodium azide (33 grams) was mixed with 275 ml of 80 percent aqueous acetone (20 percent water by volume) and 30 grams of N-methyl-N-(1-cyclohexen-1-yl) carbamoyl chloride added while maintaining a temperature below 30°C. Material was stirred for 18 hours, the solution filtered and the material vacuum treated at room temperature. The residue was dissolved in ether, washed with water and dried over anhydrous magnesium sulfate. The ether solution was filtered and the ether removed by vacuum evaporation near room temperature to yield the azide as a residue.

Preparation of carbamoyl azides not possessing a 1-cyclohexen-1-yl moiety was carried out with sodium azide in refluxing aqueous acetone.

The starting N-1-alkenyl-carbamoyl chlorides can also be prepared in accordance with the procedure set forth in Belgian Pat. No. 744,409 by reacting Schiff's bases with phosgene. The carbamoyl chlorides can then be reacted with sodium azide to form carbamoyl azide starting material for the process of this invention.

The substituted imidazolin-2-ones produced in accordance with this invention find uses as analgesics, antipyretics, anti-inflammatories, herbicides and as intermediates in the preparation of imidazolidinone by catalytic hydrogenation employing hydrogen at 60 psig and a platinum oxide catalyst. The imidazolidinones are readily hydrolyzed to diamines (see U. S. Pat. No. 2,514,380) which are useful in the production of polyurethanes, polyamides and the like.

The following examples serve to further illustrate this invention. All parts are parts by weight unless otherwise expressly set forth.

EXAMPLE 1

N-alyl-N-(1-cyclohexen-1-yl)carbamoyl azide (9.0 grams, 0.0445 mole) was refluxed in chlorobenzene for 5 hours. The chlorobenzene was removed by vacuum evaporation and a residue was obtained which was shown by nuclear magnetic resonance spectral analysis to consist of about 20 percent 1-allyl-4,5,6,7-tetrahydro-3-indazolinone and 80 percent 1-(1-cyclohexen-1-yl)-4-methyl-4-imidazolin-2-one. This residue was treated with about 500 ml of boiling ether. The ether solution was decanted and evaporated to give a solid that was recrystallized from ethyl acetate yielding crystals having a melting point of 107°–108°C. These crystals were identified as 1-allyl-4,5,6,7-tetrahydro-3-indazolinone. The ether insoluble material was recrystallized from acetonitrile to give 3.8 grams of crystals (m.p. 156°–161°C) which were identified as 1-(1-cyclohexen-1-yl)-4-methyl-4-imidazolin-2-one by nuclear magnetic resonance spectral analysis, infrared spectral analysis and elemental analysis.

EXAMPLE 2

N-allyl-N-phenylcarbamoyl azide (5 grams, 0.025 mole) prepared in the general manner set forth above was heated in chlorobenzene at reflux temperature for 2 hours. The chlorobenzene was evaporated and the residue, a semi-solid, was triturated with ether to give 2.4 grams of a solid (m.p. 170°C). This solid was recrystallized from acetonitrile to give crystals which were identified as 1-phenyl-4-methyl-4-imidazoline-2-one by infrared and nuclear magnetic resonance spectral analysis and by elemental analysis.

EXAMPLE 3

Diallylcarbamoyl chloride (16 grams, 0.10 mole) was placed in 100 ml of 80 percent aqueous acetone with 13 grams of sodium azide. After refluxing for 3 hours, the material was cooled, filtered, and the filtrate vacuum treated to remove most of the acetone. The residue was taken up in ether, washed twice with water and the ether solution dried over magnesium sulfate. The solution was then filtered and the ether evaporated off under vacuum at room temperature, yielding 12.4 grams of a residue which was identified as N,N-diallyl carbamoyl azide. The N,N-diallyl carbamoyl azide, (11.8 grams) was heated in chlorobenzene at reflux for 3 hours. The chlorobenzene was removed by vacuum evaporation leaving a residual oil which solidified on scratching the vessel with a stirring rod. The solid was triturated with ether to give 7.5 grams crystals (m.p. 100°–105°) which were identified as 1-allyl-4-methyl-4-imidazolin-2-one by infrared, nuclear magnetic resonance spectral analysis and elemental analysis.

EXAMPLE 4

N-Cinnamyl-N-methylcarbamoyl azide (4.6 g, 0.0213 mole) was heated at reflux in chlorobenzene for 3 hours. The chlorobenzene was removed by vacuum evaporation and the residue recrystallized from ethyl acetate to give 1.4 grams of crystals (m.p. 159°–160°C) which were identified as 1-methyl-4-benzyl-4-imidazoline-2-one by infrared and nuclear magnetic resonance spectral analysis and elemental analysis.

Following the procedure of the previous example, the following azides were decomposed into the corresponding imidazolin-2-ones:

| | |
|---|---|
| N-allyl-N-benzyl carbamoyl azide | to 1-benzyl-4-methyl-4-imidazolin-2-one (m.p. 162°–165° C.) |
| N-allyl-N-(3,4-dichlorophenyl) Carbamoyl azide | to 1-(3,4-dichlorophenyl)-4-methyl-4-imidazolin-2-one (m.p. 176°–178° C) |
| N-allyl-N-(2,4-dichlorobenzyl) carbamoyl azide | to 1-(2,4-dichlorobenzyl)-4-methyl-4-imidazolin-2-one (m.p. 176°–178° C) |
| N-allyl-N-p-chlorobenzyl carbamoyl azide | to 1-p-chlorobenzyl-4-methyl-4-imidazolin-2-one (m.p. 97°–124° C) |
| N-allyl-N-(2,6-dichlorobenzyl) carbamoyl azide | to 1-(2,6-dichlorobenzyl)-4-methyl-4-imidazolin-2-one (m.p. 210°–216° C) |
| N-allyl-N-(2-phenylethyl) carbomoyl azide | to 1-(2-phenylethyl)-4-methyl-4-imidazolin-2-one (m.p. 102°–105° C) |
| N-allyl-N-(3-chloro-4-tolyl) | |

| | |
|---|---|
| carbamoyl azide | to 1-(3-chloro-4-tolyl)-4-methyl-4-imidazolin-2tone (m.p. 138°–150° C) |
| N-allyl-N-(alpha-methylbenzyl) carbamoyl azide | to 1-(alpha-methylbenzyl)-4-methyl-4-imidazolin-2-one (m.p. 133.5°–140° C) |
| N-allyl-N-(2-fluorophenyl) carbamoyl azide | to 1-(2-fluorophenyl)-4-methyl-4-imidazolin-2-one |
| N-allyl-N-ethylcarbamoyl azide | to 1-ethyl-4-methyl-4-imidazolin-2-one |
| N-phenyl-N-(2-buten-1-yl)-carbamoyl azide | to 1-phenyl-4-ethyl-4-imidazolin-2-one |
| N-phenyl-N-(1-methyl-2-propen-1-yl)carbamoyl azide | to 1-phenyl-4,5-dimethyl-imidazolin-2-one |
| N-allyl-N-(4-methyl-1-cyclohexen-1-yl)carbamoyl azide | to 1-(4-methyl-1-cyclohexen-1-yl)-4-methyl-4-imidazolin-2-one (m.p. 128°–135° C) |

What is claimed is:

1. A process for the preparation of an imidazo-lin-2-one of the formula $$\begin{array}{c} H \quad H \\ R''-C=C-CH_2R' \\ R-N \quad N-H \\ \diagdown C \diagup \\ \| \\ O \end{array}$$

wherein R is alkyl of from one to 12 carbon atoms, cycloalkyl of from four to seven carbon atoms, alkenyl of from two to 12 carbon atoms, cycloalkenyl of six carbon atoms, cycloalkenyl of six carbon atoms substituted with lower alkyl, phenyl, phenyl lower alkyl and phenyl or phenyl lower alkyl wherein the phenyl group is substituted with from one to three substituents selected from the group consisting of halogen, lower alkyl and low alkoxy; R' and R'' are each independently hydrogen, lower alkyl or phenyl; which comprises heating an encarbamoyl azide of the formula $$\begin{array}{c} H \quad H \\ | \quad | \quad H \\ R''-C-C=C-R' \\ | \\ R-N-C-N_3 \\ \| \\ O \end{array}$$

wherein R, R' and R'' are as previously defined, in a solvent in which said encarbamoyl azide is soluble and which is not reactive therewith, to a temperature sufficiently elevated so as to cause said encarbamoyl azide to decompose, thereby forming said imidazoline-2-one.

2. The process of claim 1 wherein the temperature is from 40°C to about 200°C.

3. The process as in claim 1 wherein the temperature is from 100°C to about 150°C.

4. The process of claim 1 wherein the solvent is chlorobenzene.

5. The process of claim 4 wherein the encarbamoyl azide is N-allyl-N-(1-cyclo-hexen-1-yl) carbamoyl azide.

6. The process of claim 4 wherein the encarbamoyl azide in N-cinnamoyl-N-methylcarbamoyl azide.

7. The process of claim 4 wherein the encarbamoyl azide is N-allyl-N-phenylcarbamoyl azide.

8. The process of claim 4 wherein the encarbamoyl azide is N-diallylcarbamoyl azide.

9. The process of claim 4 wherein the encarbamoyl azide is N-allyl-N-(3,4-dichlorophenyl)carbamoyl azide.

* * * * *